US011459097B2

(12) United States Patent
Huber et al.

(10) Patent No.: US 11,459,097 B2
(45) Date of Patent: Oct. 4, 2022

(54) EROSION PROTECTION COATING WITH SCREEN

(71) Applicant: Bell Helicopter Textron Inc., Fort Worth, TX (US)

(72) Inventors: Bryan John Huber, Keller, TX (US); Jared Mark Paulson, Fort Worth, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 1025 days.

(21) Appl. No.: 16/160,121

(22) Filed: Oct. 15, 2018

(65) Prior Publication Data

US 2020/0115044 A1    Apr. 16, 2020

(51) Int. Cl.
| B64C 27/473 | (2006.01) |
| F01D 5/28 | (2006.01) |
| B64F 5/40 | (2017.01) |
| B32B 1/00 | (2006.01) |
| B32B 7/12 | (2006.01) |

(Continued)

(52) U.S. Cl.
CPC ............ *B64C 27/473* (2013.01); *B29C 65/48* (2013.01); *B32B 1/00* (2013.01); *B32B 7/12* (2013.01); *B32B 37/12* (2013.01); *B32B 38/14* (2013.01); *B64F 5/40* (2017.01); *F01D 5/282* (2013.01); *F01D 5/288* (2013.01); *B32B 2037/243* (2013.01); *B32B 2255/20* (2013.01); *B32B 2255/205* (2013.01); *B32B 2305/38* (2013.01); *B32B 2311/00* (2013.01); *B32B 2603/00* (2013.01); *B64C 2027/4733* (2013.01); *C23C 4/08* (2013.01); *C23C 4/10* (2013.01); *F05D 2230/313* (2013.01); *F05D 2230/40* (2013.01); *F05D 2230/90* (2013.01);

(Continued)

(58) Field of Classification Search
CPC . B32B 1/00; B32B 2037/243; B32B 2255/20; B32B 2255/205; B32B 2305/38; B32B 2311/00; B32B 2603/00; B32B 37/12; B32B 38/14; B32B 7/12; Y02T 50/60; F05D 2220/36; F05D 2230/313; F05D 2230/40; F05D 2230/90; F05D 2240/303; F05D 2300/10; F05D 2300/133; F05D 2300/6012; F05D 2300/6032; F05D 2300/6033; F01D 5/147; F01D 5/282; F01D 5/284; F01D 5/288; C23C 4/02; C23C 4/06; C23C 4/08; C23C 4/10; C23C 4/134; C23C 4/18; B64C 11/205; B64C 2027/4733; B64C 27/473; B65B 53/063; B65G 15/12; B65G 17/08; B29C 65/48

See application file for complete search history.

(56) References Cited

U.S. PATENT DOCUMENTS

| 10,589,850 | B2* | 3/2020 | Nissen | F01D 5/288 |
| 2002/0164251 | A1* | 11/2002 | Sehgal | B64C 27/82 |
| | | | | 29/889.71 |

(Continued)

*Primary Examiner* — Sonya M Sengupta
(74) *Attorney, Agent, or Firm* — Edwin S. Flores; Daniel J. Chalker; Chalker Flores, LLP

(57) ABSTRACT

The present invention includes an apparatus for protecting an aerodynamic surface from erosion including a screen capable of being applied to a leading edge of the aerodynamic surface; and an erosion protection coating applied to the screen before or after the screen is applied to the leading edge, wherein the erosion protection coating protects the aerodynamic surface from erosion.

10 Claims, 14 Drawing Sheets

(51) Int. Cl.
    *B29C 65/48*       (2006.01)
    *B32B 37/12*       (2006.01)
    *B32B 38/14*       (2006.01)
    *C23C 4/08*        (2016.01)
    *C23C 4/10*        (2016.01)
    *B32B 37/24*       (2006.01)

(52) U.S. Cl.
    CPC .... *F05D 2240/303* (2013.01); *F05D 2300/10* (2013.01); *F05D 2300/133* (2013.01)

(56) References Cited

U.S. PATENT DOCUMENTS

| | | | |
|---|---|---|---|
| 2009/0092842 A1* | 4/2009 | Hoover | B32B 15/08 |
| | | | 427/407.1 |
| 2013/0101432 A1* | 4/2013 | Harris, Jr. | F01D 5/286 |
| | | | 416/241 R |
| 2014/0011414 A1* | 1/2014 | Kruckenberg | B64C 3/20 |
| | | | 87/8 |
| 2016/0137856 A1* | 5/2016 | Birnkrant | C08K 7/24 |
| | | | 523/218 |
| 2018/0029699 A1* | 2/2018 | Nissen | B64C 27/473 |
| 2020/0115044 A1* | 4/2020 | Huber | B64C 11/205 |

\* cited by examiner ns EROSION PROTECTION COATING WITH SCREEN

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of protection of aerodynamic surfaces from erosion, and more particularly, to the use of a coating for such protection.

BACKGROUND OF THE INVENTION

Without limiting the scope of the invention, its background is described in connection with the use of an erosion protective coating.

Aerodynamic surfaces such as rotor blades are subject to erosion from sand, dust, rain, and foreign object collisions. Generally, rotor blade erosion protection has historically consisted of a primary erosion strip on the leading edge, with some added layers of metallic materials near the blade tip where the erosion is greatest. With some materials, the fabrication is complex and expensive. Such an erosion strip is often repaired or replaced, a process that requires much time and care to prevent damage to the underlying rotor blade structure. Where erosion protection materials have been used, they have generally been applied to solid metal substrates, and those solid metal substrates have been attached to underlying aerodynamic surface with strong adhesives.

A less expensive, yet effective, and flexible method and system of protecting a rotor blade, and more generally an aerodynamic surface, from erosion, and that does not require risk of damage to the underlying blade during maintenance and repair, is desired.

SUMMARY OF THE INVENTION

In some embodiments of the invention, an apparatus for protecting an aerodynamic surface from erosion includes: a screen capable of application to a leading edge of the aerodynamic surface; and one or more erosion protection coatings applied to the screen before or after the screen is applied to the leading edge, wherein the one or more erosion protection coatings protect the aerodynamic surface from erosion. In one aspect, the apparatus further includes an adhesive layer that bonds the screen to the leading edge. In another aspect, the one or more erosion protection coatings provide one or more visual indications of an erosion location in the erosion protection coating. In another aspect, the one or more erosion protection coatings comprise multiple layers, and each layer has a different color or indicium. In another aspect, the screen is cured with the leading edge prior to application of the one or more erosion protection coatings. In another aspect, the one or more erosion protection coatings are applied to the screen by vapor deposition, a thermal spraying process, a thermal high-temperature fusion process, or an ionic spraying process. In another aspect, the screen is flexible such that application to the leading edge can be accomplished manually, pre-formed to a shape of the leading edge before application to the leading edge, or both. In another aspect, the aerodynamic surface is a rotor blade, a propeller blade, a wing, a horizontal stabilizer, a vertical stabilizer, a canard, or a turbine blade. In another aspect, the screen comprises metal-matrix composites, polymer-metal composites, ceramics-metal composites, ceramic-polymer composites, titanium, steel, nickel, aluminum, or some combination of those materials. In another aspect, the one or more erosion protective coatings comprise at least one of: tungsten carbide, titanium nitride, or chromium. In another aspect, the one or more erosion protective coatings comprise two or more layers, and each layer comprises a different erosion protection coating material, a different concentration of different erosion protection coating material, or a combination of different erosion protection coating materials and different concentrations of the different erosion protection coating material.

In some embodiments of the invention, a method of protecting an aerodynamic surface from erosion includes: providing the aerodynamic surface comprising a leading edge; applying a screen to the leading edge to carry one or more erosion protection coatings; and applying one or more erosion protection coatings to the screen before or after the screen is applied to the leading edge, wherein the one or more erosion protection coatings protect the aerodynamic surface from erosion. In one aspect, the method further includes applying an adhesive layer before applying the screen, wherein the adhesive layer bonds the screen to the leading edge. In another aspect, the one or more erosion protection coatings provide a visual indication of an erosion location in the one or more erosion protection coatings. In another aspect, the one or more erosion protection coatings comprise a plurality of layers, and each layer has a different color or indicium. In another aspect, the screen is cured with the leading edge. In another aspect, the applying the one or more erosion protection coatings to the screen includes vapor deposition, a thermal spraying process, a thermal high-temperature fusion process, or an ionic spraying process. In another aspect, the screen is flexible such that applying it to the leading edge can be accomplished manually, pre-formed to a shape of the leading edge before application to the leading edge, or both. In another aspect, the aerodynamic surface is a rotor blade, a propeller blade, a wing, a horizontal stabilizer, a vertical stabilizer, a canard, or a turbine blade. In another aspect, the screen comprises metal-matrix composites, polymer-metal composites, ceramics-metal composites, ceramic-polymer composites, titanium, steel, nickel, aluminum, or some combination of those materials. In another aspect, the one or more erosion protective coatings comprise at least one of: tungsten carbide, titanium nitride, or chromium. In another aspect, the one or more erosion protective coatings comprise two or more layers, and each layer comprises a different erosion protection coating material, a different concentration of different erosion protection coating material, or a combination of different erosion protection coating materials and different concentrations of the different erosion protection coating material.

In some embodiments of the invention, a method of maintaining an aerodynamic surface with one or more erosion protection coatings includes: inspecting the aerodynamic surface; determining an area of erosion on the aerodynamic surface requiring maintenance; obtaining data on shape of aerodynamic surface prior to its use; calculating a required coating for area of erosion to restore the shape prior to use; and applying the required coating based on the calculating. In one aspect, the aerodynamic surface includes a screen capable of being applied to a leading edge of the aerodynamic surface; and one or more erosion protection coatings applied to the screen before or after the screen is applied to the leading edge, wherein the one or more erosion protection coatings protect the aerodynamic surface from erosion. In another aspect, the one or more erosion protection coatings provide one or more visual indications of an erosion location in the one or more erosion protection coatings. In another aspect, the one or more erosion protection coatings comprise multiple layers, and each layer has a different color or indicium. In another aspect, the one or more erosion protective coatings comprise two or more layers, and each layer comprises a different erosion protection coating material, a different concentration of different erosion protection coating material, or a combination of different erosion protection coating materials and different concentrations of the different erosion protection coating material. In another aspect, the aerodynamic surface is a rotor blade, a propeller blade, a wing, a horizontal stabilizer, a vertical stabilizer, a canard, or a turbine blade. In another aspect, the method further includes rebalancing the aerodynamic surface if it is a rotor blade or a propeller blade.

In some embodiments of the invention, a rotorcraft includes a fuselage; an engine coupled to the fuselage; a rotor coupled to the engine; the rotor comprising rotor blades, at least one rotor blade including: a screen applied to a leading edge of the at least one of the rotor blades; and one or more erosion protection coatings applied to the screen before or after the screen is applied to the leading edge, wherein the one or more erosion protection coatings protect the rotor blade from erosion.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 6B:
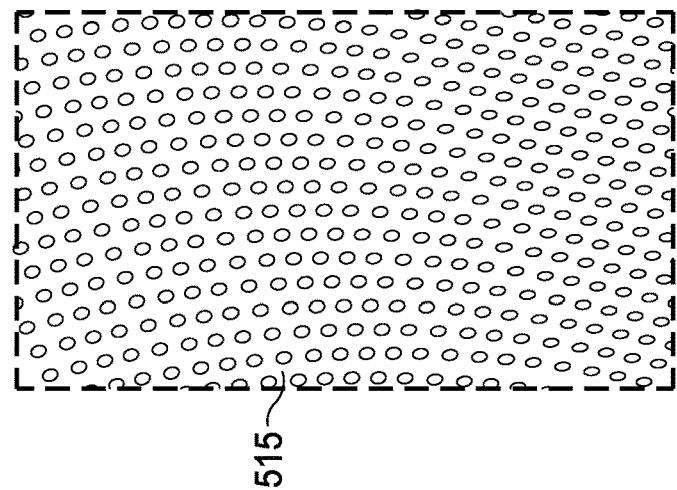
FIG. 6B shows the detailed structure of the screen of FIG. 6A.
Figure 7:
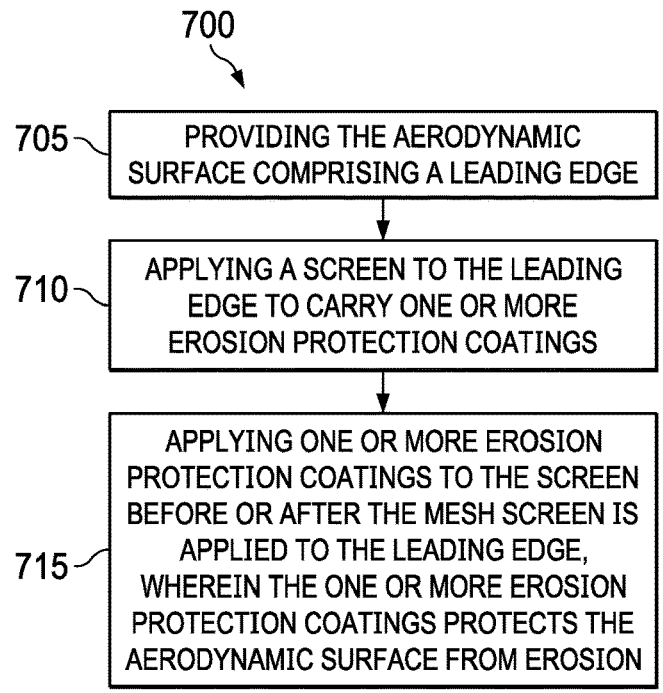
FIG. 7 shows a flowchart of a method embodiment of the present invention.
Figure 8:
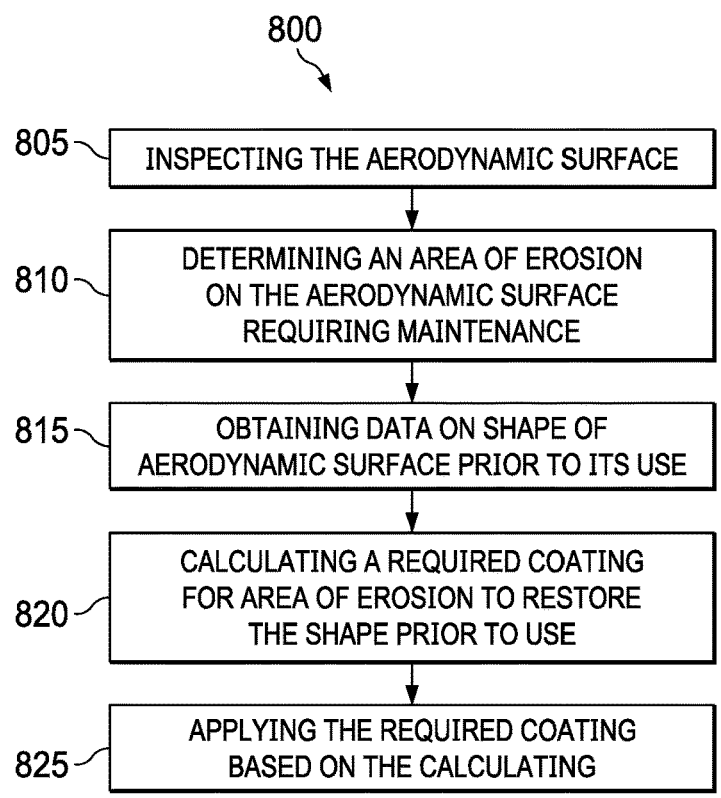
FIG. 8 shows a flowchart of another method embodiment of the present invention.

FIGS. 1, 2, 3A, 3B, 4A, and 4B illustrate rotorcraft with which the present invention may be used. FIGS. 5A, 5B, 6A, and 6B show various aspects of the present invention, using a rotor as a non-limiting example. FIGS. 7 and 8 illustrate method embodiments of the present invention.

Figure 1:
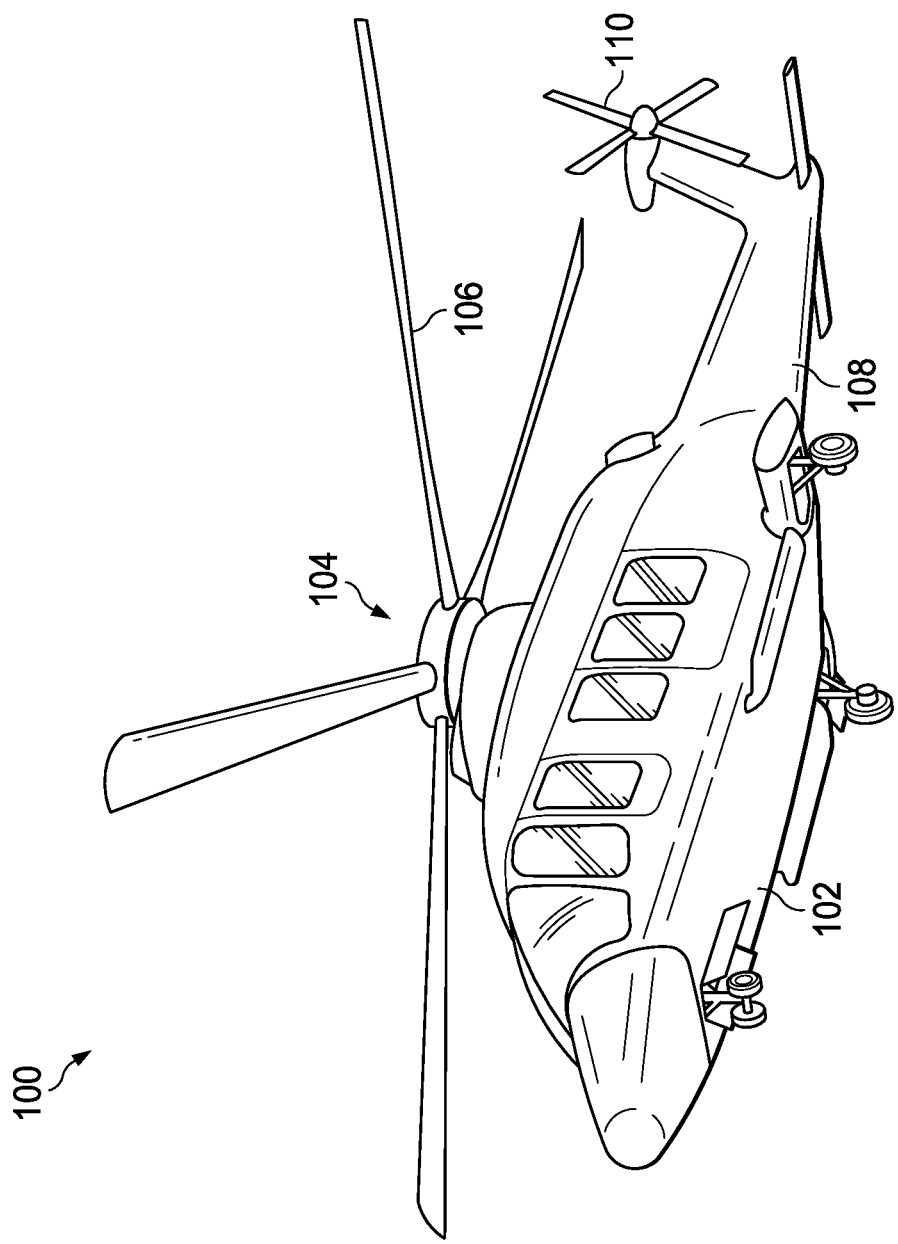
FIG. 1 shows a side view of a helicopter according to a particular embodiment of the present invention.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110. The present invention can be applied to surfaces throughout the aircraft 100, e.g., the blades 106, control surfaces, the tail or tail rotors 110, etc.

Figure 2:
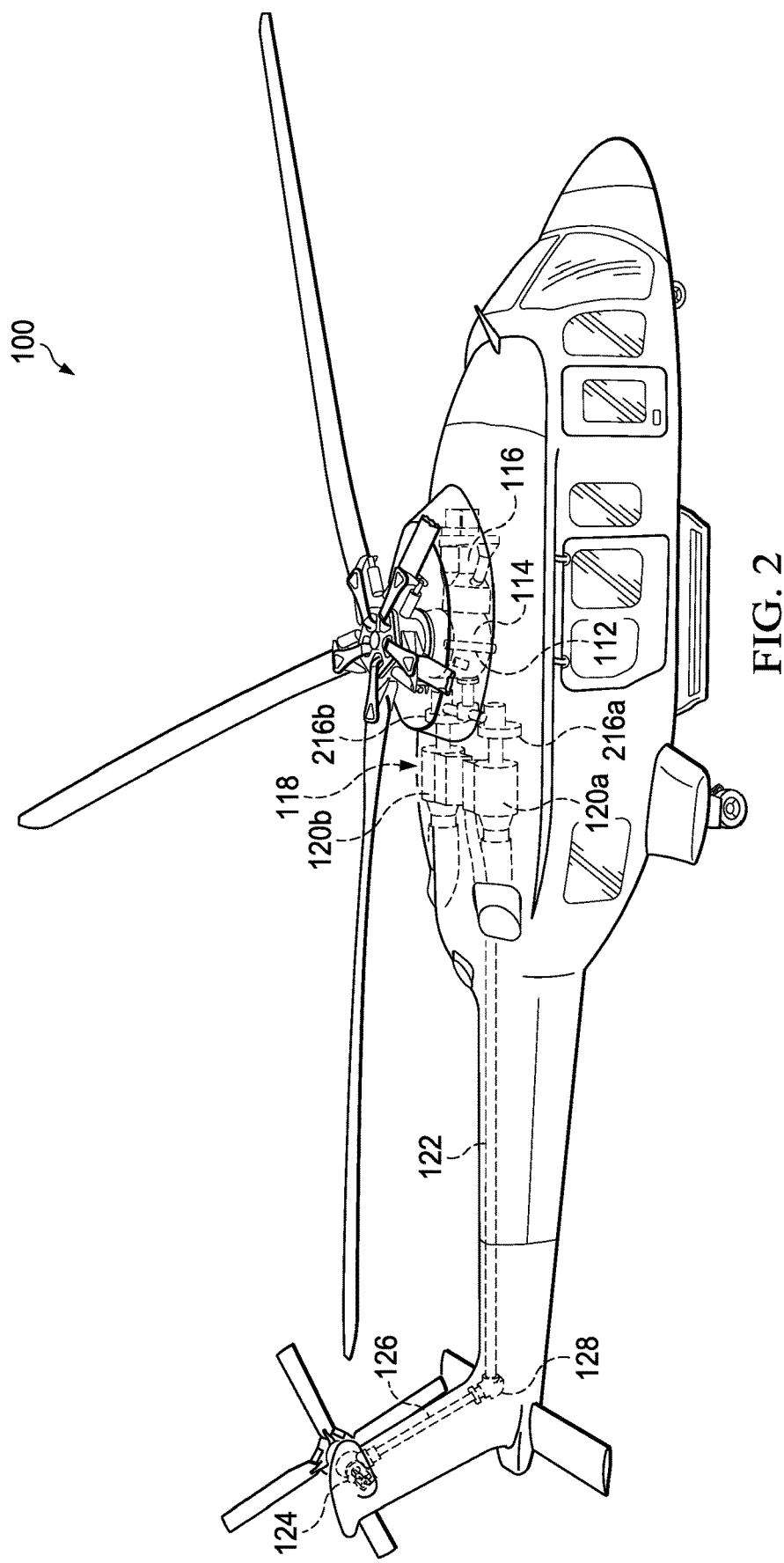
FIG. 2 shows a partial cross-section, perspective view of a helicopter according to an embodiment of the present invention.

For example, FIG. 2 shows a partial cross-section perspective view of aircraft 100 that includes additional detail of the present invention. Aircraft 100 further includes a rotor mast 112, which is connected to the main rotor gearbox 114 via a main rotor mast. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation to the tail rotor gear box 124, which is connected via tail rotor drive shaft 126 and intermediate gear box 128.

Figure 3A:
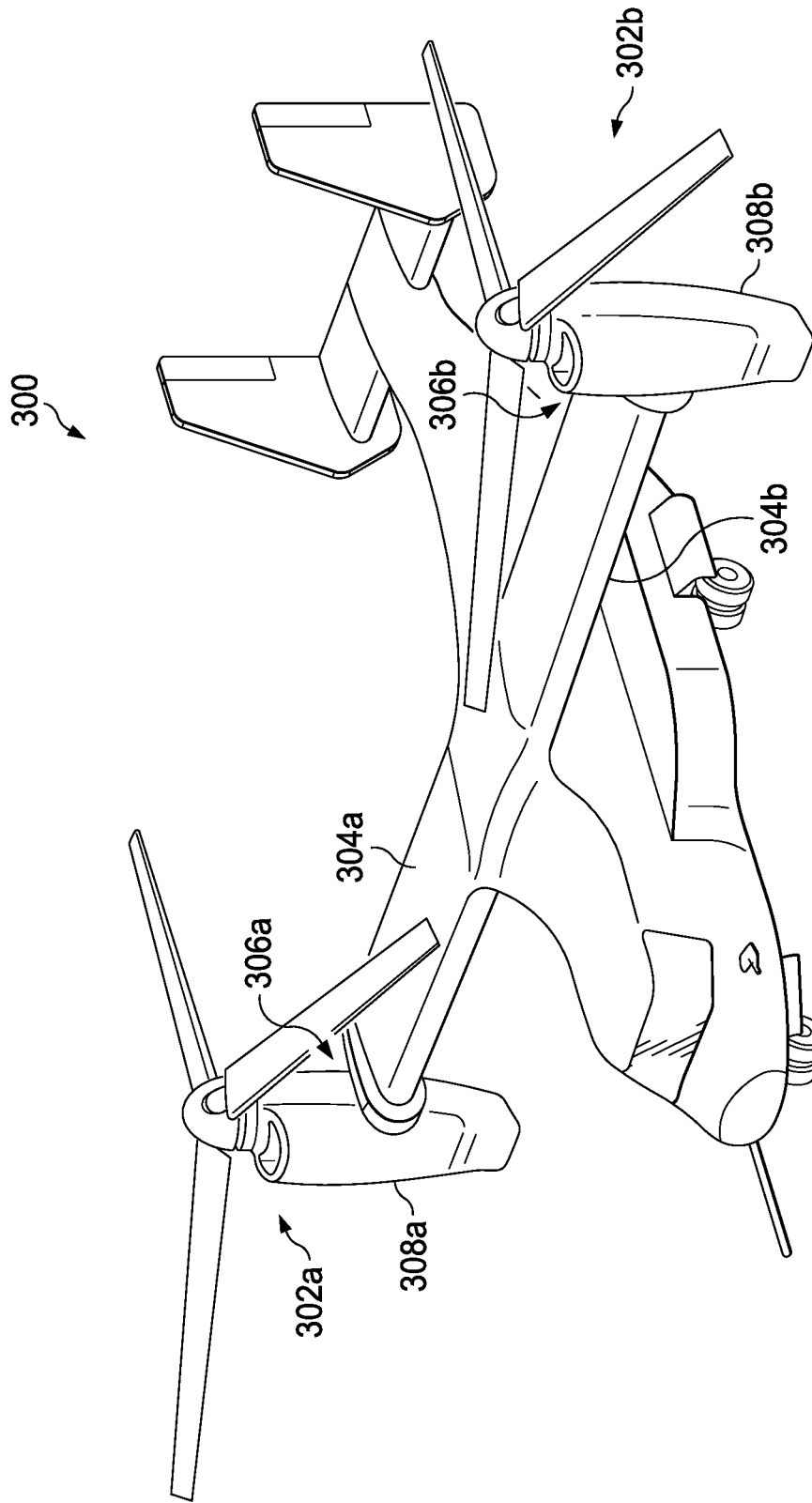
FIG. 3A shows a perspective view of a first tiltrotor aircraft in which the rotor system is in a takeoff-and-landing mode or hover mode according to a particular embodiment of the present invention.
Figure 3B:
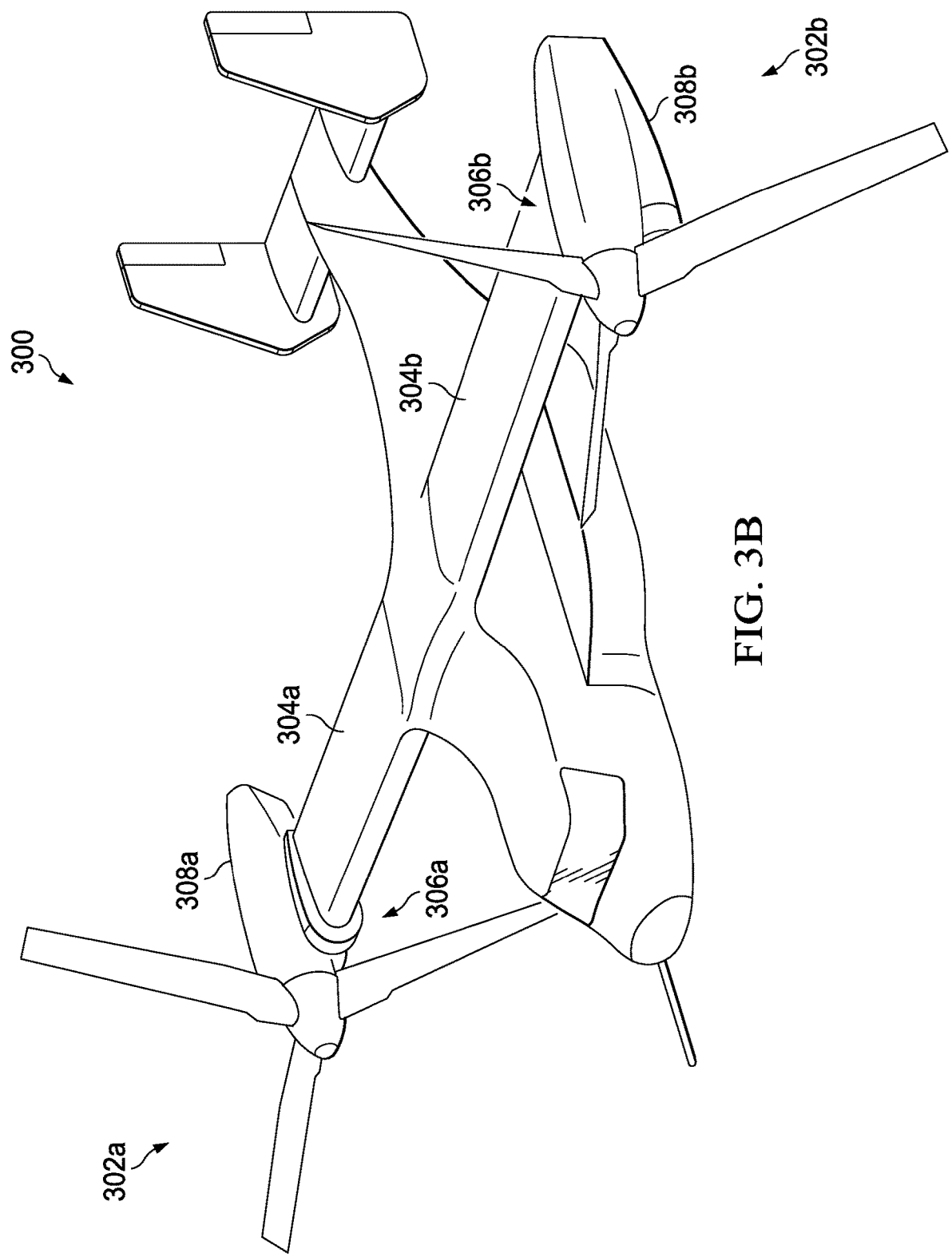
FIG. 3B shows a perspective view of the first tiltrotor aircraft in which the rotor system is in a cruise mode according to a particular embodiment of the present invention.

FIGS. 3A and 3B show a tiltrotor aircraft 300 that utilizes the system and methods in accordance with the present invention. FIG. 3A illustrates the tiltrotor aircraft 300 in takeoff-and-landing mode or hover mode, and FIG. 3B depicts the tiltrotor aircraft 300 in cruise mode. Tiltrotor aircraft 300 includes tiltrotor assemblies 302a and 302b that are carried by wings 304a and 304b, and are disposed at end portions 306a and 306b of wings 304a and 304b, respectively. Tiltrotor assemblies 302a and 302b include nacelles 308a and 308b, which carry the engines and transmissions of tiltrotor aircraft 300. Tiltrotor assemblies 302a and 302b move or rotate relative to wings 304a and 304b between a helicopter or hover mode in which tiltrotor assemblies 302a and 302b are tilted upward, such that tiltrotor aircraft 300 flies like a conventional helicopter; and an airplane or cruise mode in which tiltrotor assemblies 302a and 302b are tilted forward, such that tiltrotor aircraft 300 flies like a conventional propeller driven aircraft.

Figure 4A:
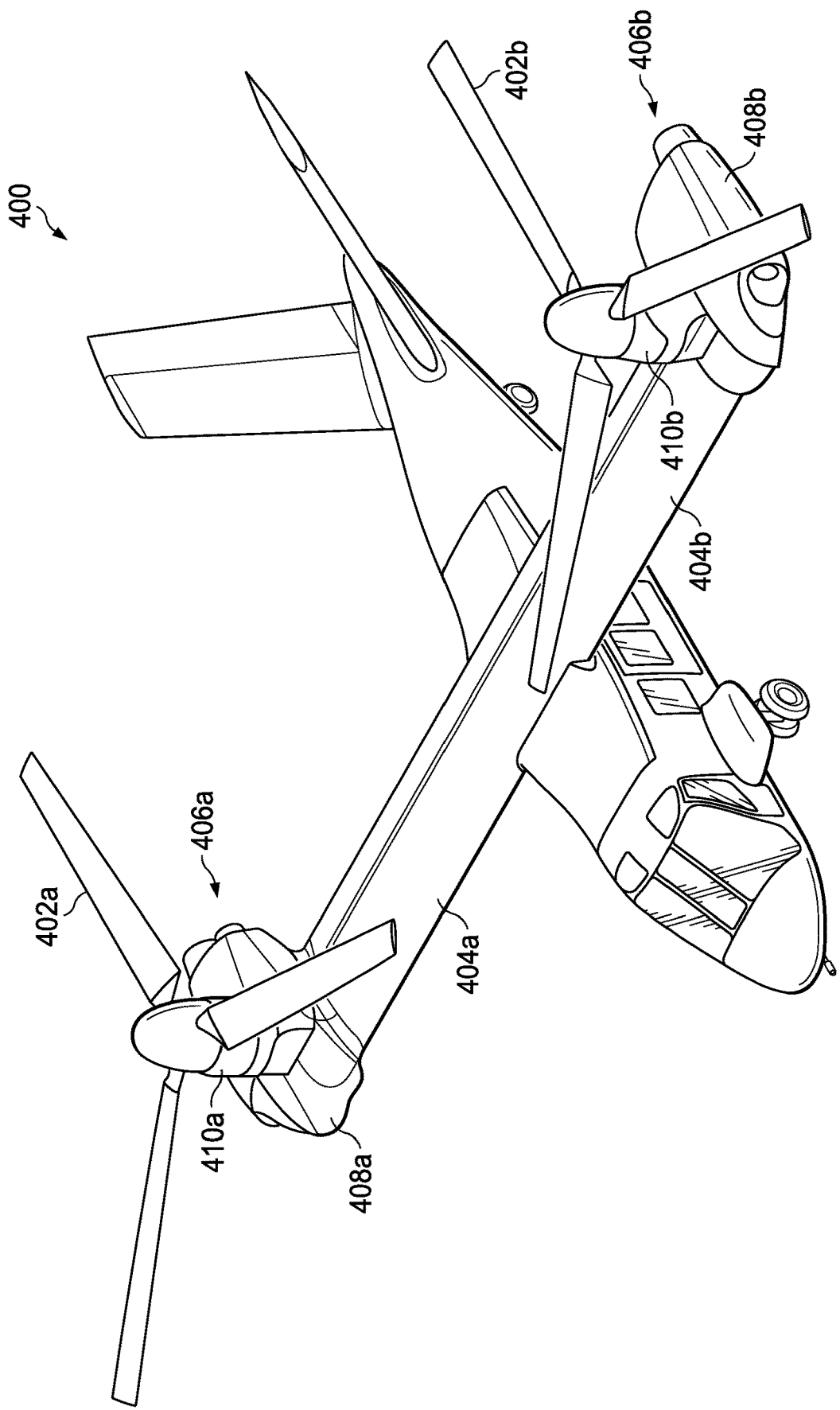
FIG. 4A shows a perspective view of a second tiltrotor aircraft in which the rotor system is in a takeoff-and-landing mode or hover mode according to a particular embodiment of the present invention.
Figure 4B:
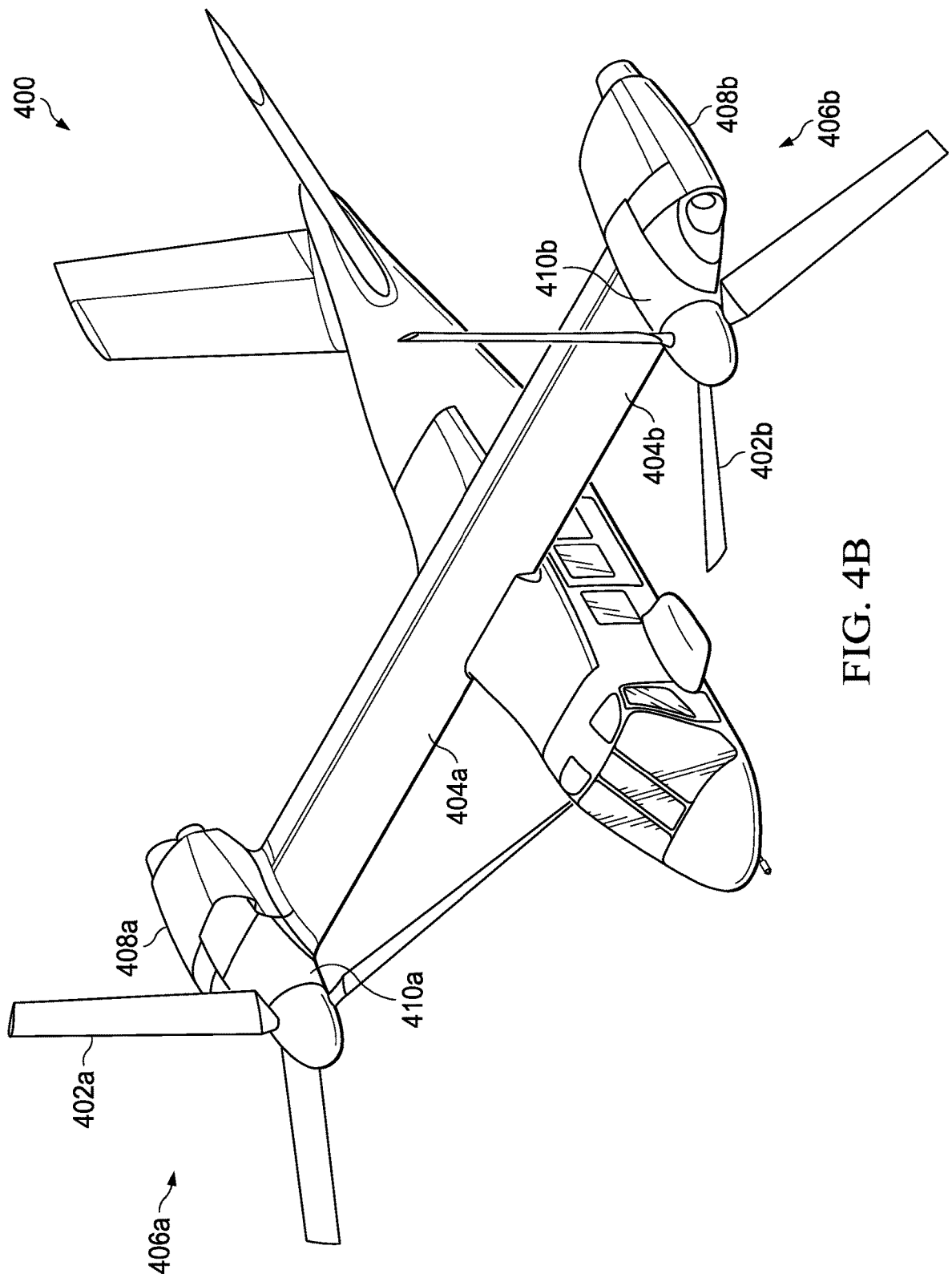
FIG. 4B shows a perspective view of the second tiltrotor aircraft in which the rotor system is in a cruise mode according to a particular embodiment of the present invention.

FIGS. 4A and 4B show another tiltrotor aircraft 400 that utilizes the system and methods in accordance with the present invention. FIG. 4A depicts the tiltrotor aircraft 400 in takeoff-and-landing mode or hover mode, and FIG. 4B illustrates the tiltrotor aircraft 400 in cruise mode. Tiltrotor aircraft 400 includes tiltrotor assemblies 402a and 402b that are carried by wings 404a and 404b, and are disposed at end portions 406a and 406b of wings 404a and 404b, respectively. Tiltrotor assemblies 402a and 402b include nacelles 408a and 408b, which include the engines and transmissions of tiltrotor aircraft 400. In this embodiment, the engines are fixed to the wing and do not rotate, rather, only the pylons 410a and 410b with the tiltrotor assemblies 402a and 402b rotate. Tiltrotor assemblies 402a and 402b move and rotate relative to wings 404a and 404b and the nacelles 408a and 408b. The tiltrotor assemblies 402a and 402b do not more relative to the wings 404a and 404b. Instead, during the transition between a helicopter or hover mode only the pylons 410a and 410b with the tiltrotor assemblies 402a and 402b rotate to redirect the thrust from the tiltrotor assemblies 402a and 402b. The tiltrotor aircraft 400 is still able to fly like a conventional helicopter; and an airplane or cruise mode in which one of the rotors are tilted forward, such that tiltrotor aircraft 400 flies like a conventional propeller driven aircraft.

Figures 5A, 5B:
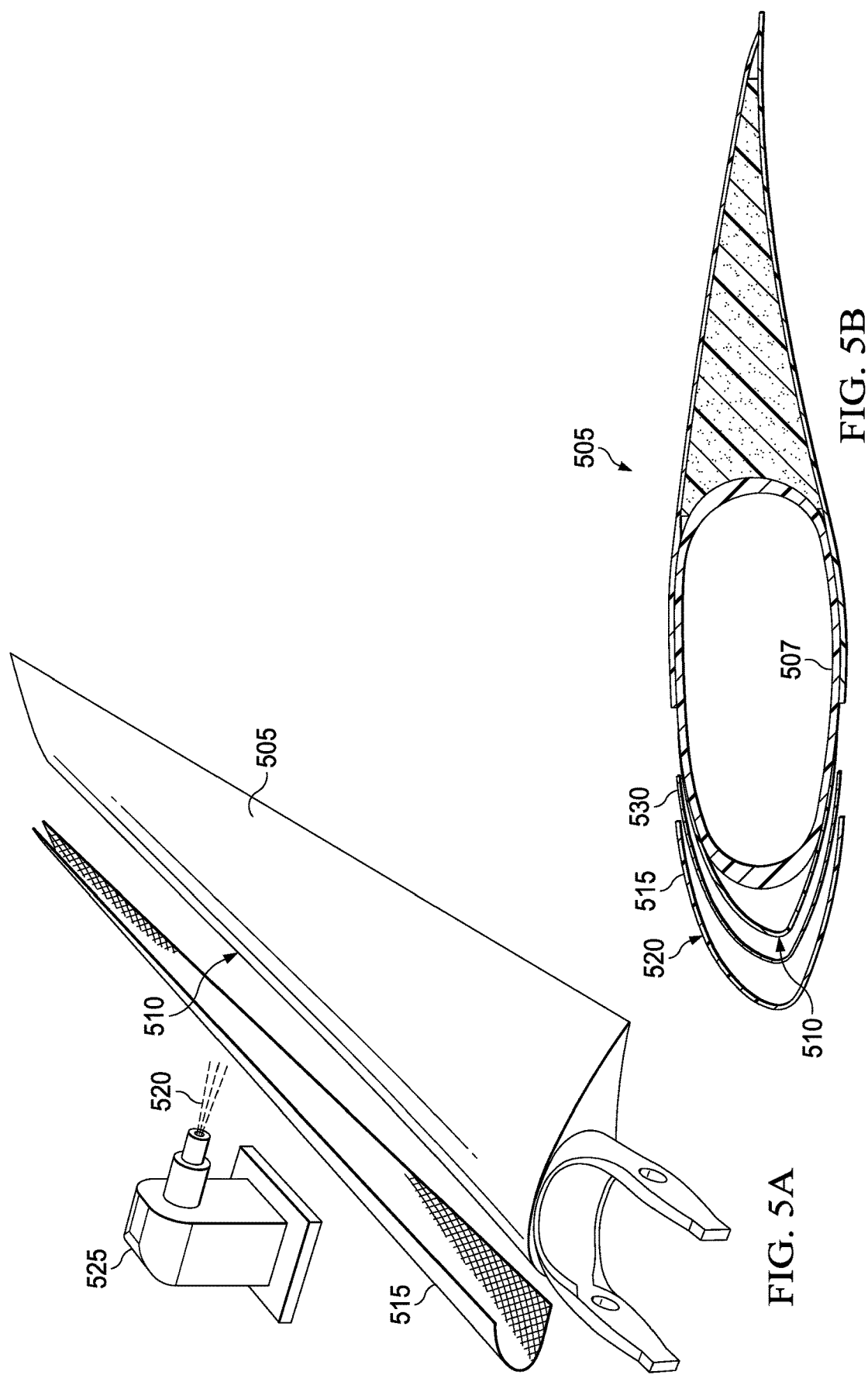
FIG. 5A illustrates an exploded view of an embodiment of the present invention.
FIG. 5B shows an exploded cross-section of the embodiment of the present invention of FIG. 5B.

FIG. 5A illustrates an exploded view of an embodiment of the present invention. Rotor blade 505 is the aerodynamic surface to which the erosion protection coating is to be applied, including leading edge 510. Rotor blade 505 is a non-limiting example. Other aerodynamic surfaces with which the present invention may be used include, without being limited to, propeller blades, wings, horizontal stabilizers, vertical stabilizers, canards, and turbine blades.

Screen 515 (or "foundation" or "carrier") is to be applied to the leading edge 510, and the one or more erosion protection coatings 520 are being applied to the screen 515 by coating application device 525. The screen 515 serves as the foundation, screen, or carrier of the one or more erosion protection coatings 520. The screen will also have some erosion resistance so it may be acceptable to leave some of the screen exposed without coating. In repair, some areas of the exposed screen 515 may be acceptable for erosion resistance without a need to re-coat the screen 515. The screen 515 can be pre-formed and applied to or adhered to the leading edge in a pre-formed shape. The screen 515 can be shaped manually or with an automated process while it is being applied to or adhered to the leading edge 510 to conform the screen 515 to the complex curved surface of the leading edge 510. Alternatively, the screen 515 can also be partially pre-formed and then partially shaped while it is being applied to the leading edge 510. Titanium, for example, is suitable as a material from which the screen can be made. The screen 515 can include one or more metal-matrix composites, one or more polymer-metal composites, one or more ceramics-metal composites, one or more ceramic-polymer composites, titanium, steel, nickel, aluminum, other suitable materials, or some combination of those materials. On some blades such as proprotor blades, solid steel strips as screens 515 for an erosion protection coating 520 are generally not as strain-capable as, for example, titanium, but openings or indentations act as strain relief features, making a steel screen 515 suitable for proprotor blades.

The screen 515 will typically have no openings, or very small openings, such that thermal coating will not reach the underlying rotor blade 505. If the openings do permit the passage of the thermal applied coating, then an erosion protective coating 520 may be applied to the screen 515 before attachment to the rotor blade 505. Alternatively, a blocking or sacrificial layer (e.g., an adhesive) may be placed between an erosion protection coating 520 and the screen 515 or between the screen 515 and the rotor blade 505 to prevent coating particulate from passing through the holes in the screen 515, protecting the leading edge 510 or any part of the rotor blade 505. A blocking or sacrificial layer may also aid in the bonding of an erosion protective coating 520 to the screen 515, in the bonding of the screen 515 to the rotor blade 505, or in holding the screen 515 to the desired shape. As an alternative to using a sacrificial layer to hold the screen to the desired shape, the screen 515 could melt partially or dissolve. A blocking or sacrificial layer may include adhesive, fiberglass, or carbon or similar materials. A blocking or sacrificial layer may come off a roll and attached by adhesive, tacked to the metal, or laid up as a separate layer, and might be repaired only if a portion of the screen 515 is replaced.

The screen 515 may be bonded to the leading edge with an adhesive layer (not shown), or it may be co-cured to a composite leading edge 510. The screen 515 may be a fine mesh to make available the largest practicable surface area to which the erosion protective coating can bond and to contribute to the flexibility of the material. In some cases the screen 515 may have no openings, but rather, indentations that permit the shape of the screen 515 to be conformed manually.

An erosion protective coating 520 is typically a highly resistant erosion coating that protects the leading edge 510 of the rotor blade 505 from erosion due to impacts of sand, dust, rain, and foreign objects such as birds. An erosion protective coating 520 can comprise, e.g., a tungsten carbide particulate, titanium nitride, or chromium, as non-limiting examples and may be coated in one or more layers. In certain embodiments, different materials, or different concentrations of the same material, or some combination, of such different materials and different concentrations, may be applied as a first, second, third or more layers that each provides different protection or to different portions of the screen 515. An erosion protective coating 520 can be applied to the screen 515, e.g., with vapor deposition, a thermal spraying process, a thermal high-temperature fusion process, or an ionic spraying process, which are non-limiting examples. It can be applied to portions of the leading edge 510 with higher erosion potentials in greater depths or in greater densities than on other portions if the leading edge 510 to provide comparatively greater protection, e.g., to protect areas subject to greater erosion such as leading edge areas near the outer end of the blade. It can be applied to portions of the leading edge 510 before or after the screen 515 is applied to the leading edge 510. The content of an erosion protective coating 520 can also be tailored for varying flexibility and varying ability to withstand strain in various locations on the leading edge 510. Further, the erosion protection coating can include two or more layers, with each layer including a different erosion protection coating material, a different concentration of different erosion protection coating material, or a combination of different erosion protection coating materials and different concentrations of the different erosion protection coating material.

An erosion protective coating 520 or the screen 515 can be provided with a coloration or an indicia that provides one or more visual indications of erosion location(s) and erosion depth(s), which can be used, for example, to help determine remaining blade life of erosion life before repair and/or replacement is needed. A patch of visible color could signify a patch of erosion, and the color of the patch would signify the depth of the erosion. For example, an erosion protective coating 520 could include a white coloring so that any erosion of the coating would show as a white patch, and the screen 515 could be colored orange so that erosion through the coating and into the screen 515 would show as an orange patch inside a white ovoid. Erosion through the screen 515 to the adhesive layer or to the underlying structure of the leading edge 510 would show as an orange ovoid inside a white ovoid.

An erosion protection coating 520 can include multiple layers, where each layer has a different color or indicium. The application of an erosion protective coating 520 can be pre-programmed according the visual cues provided by the coloration provided as described, and the colors programmed into a detector that creates a map of the erosion.

FIG. 5B shows an exploded cross-section of an erosion protection coating 520 applied to the screen 515, which is applied to the leading edge 510 of the rotor blade 505. A deicing blanket 530 is shown between the screen 515 and the leading edge 510 of the rotor blade 505. Of course, an erosion protective coating 520 and the screen 515 can be applied to other surfaces in need of erosion control.

Figure 5C:
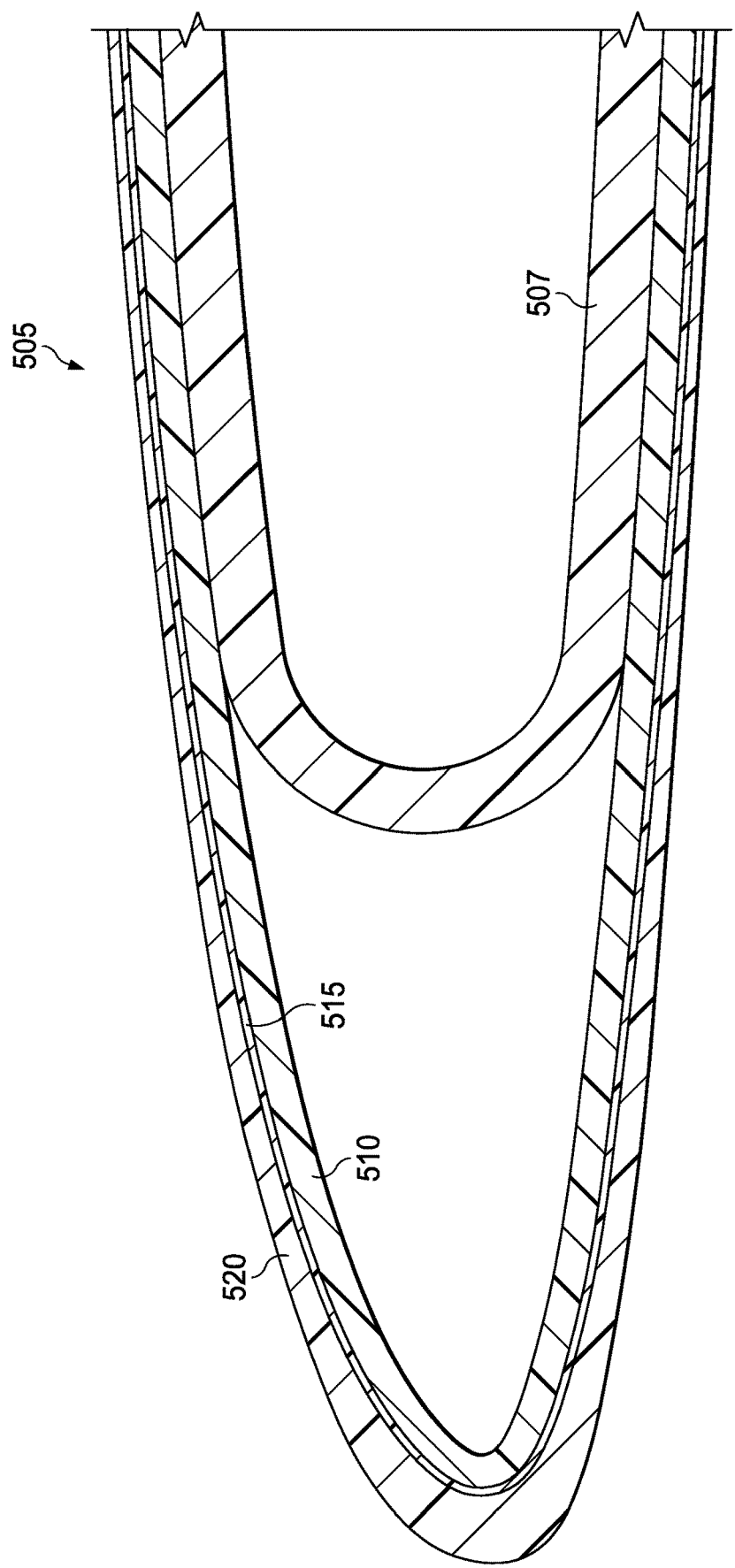
FIG. 5C shows a cross-section of an embodiment of the present invention.

FIG. 5C shows a cross-section of an embodiment of the present invention similar to that of FIG. 5B. Rotor blade 505 with spar 507 is shown. Erosion protection coating 520 is applied to the screen 515, which is applied to the leading edge 510 of the rotor blade 505. Erosion protection coating 520 includes different materials, or different concentrations of the same materials, or some combination of different materials and different concentrations.

Figure 5D:
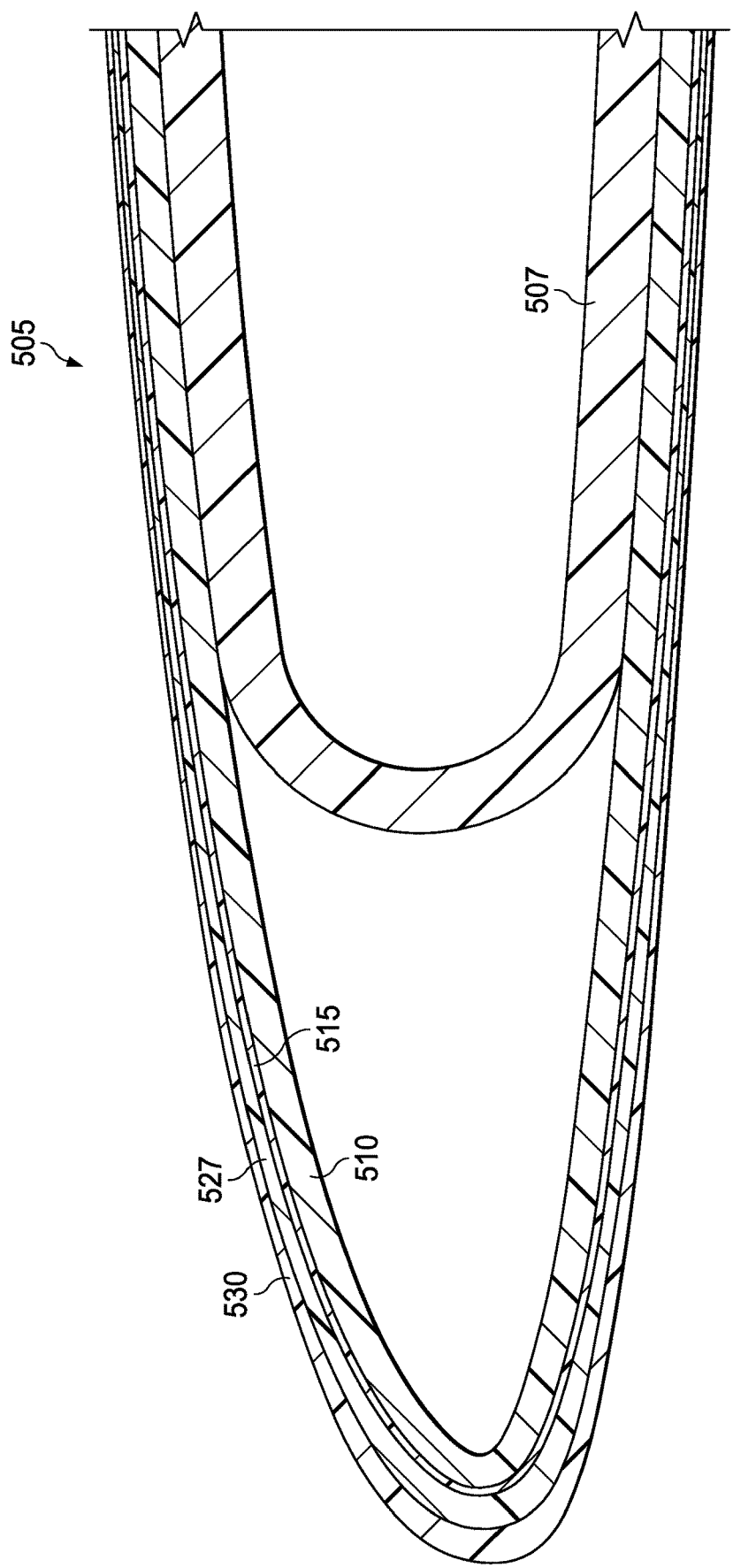
FIG. 5D shows a cross-section of another embodiment of the present invention.

FIG. 5D illustrates a cross-section of another embodiment of the present invention. Rotor blade 505 with spar 507 is shown. In this embodiment, two layers of erosion protective coating 527 and 530 are applied to the screen 515. Erosion protective coatings 527 and 530 include different materials, or different concentrations of the same materials, or some combination of different materials and different concentrations.

Figure 5E:
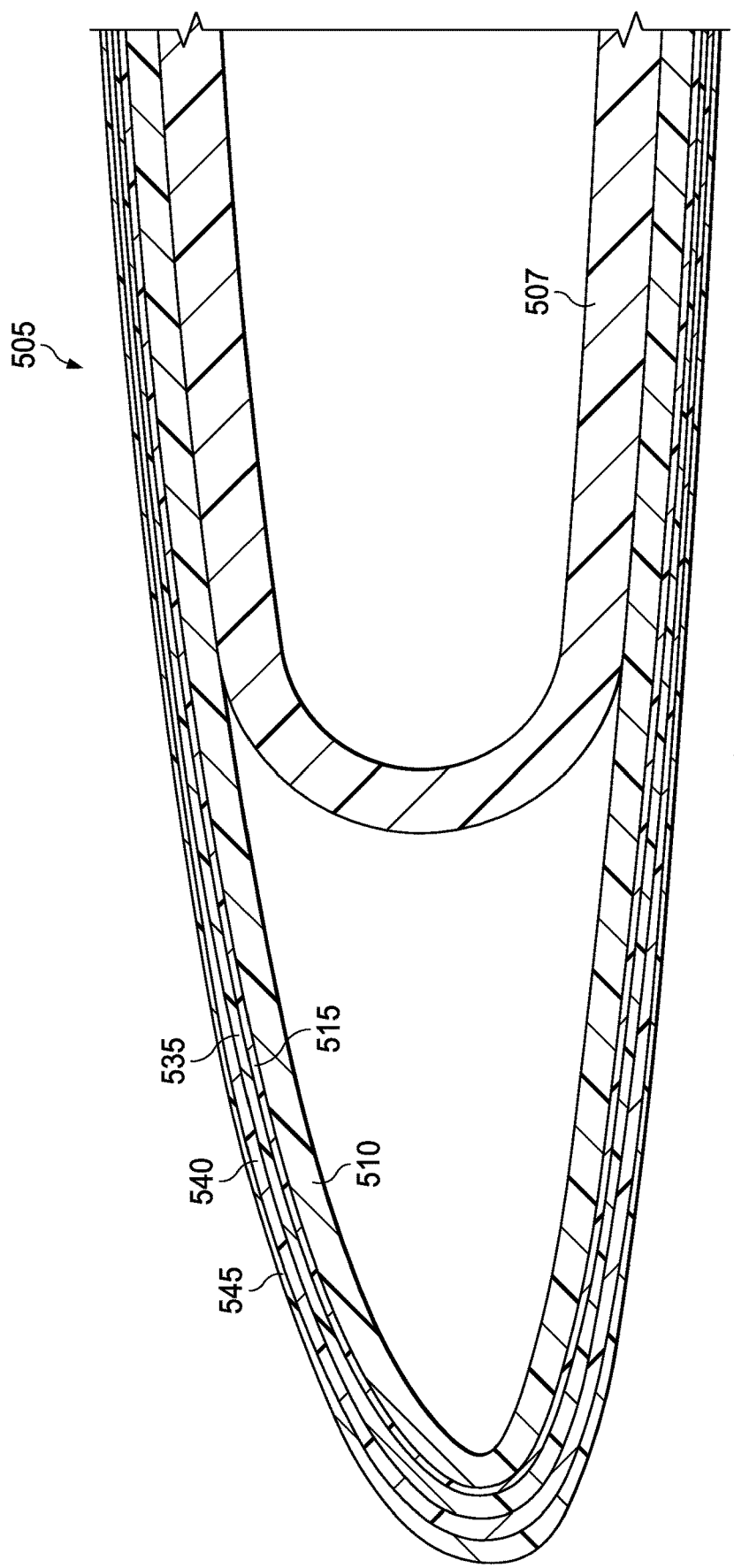
FIG. 5E shows a cross-section of another embodiment of the present invention.

FIG. 5E illustrates a cross-section of yet another embodiment of the present invention. Rotor blade 505 with spar 507 is shown. In this embodiment, three layers of erosion protective coating 535, 540, and 545 are applied to the screen 515. Erosion protective coatings 535, 540, and 545 include different materials, or different concentrations of the same materials, or some combination of different materials and different concentrations.

Figure 5F:
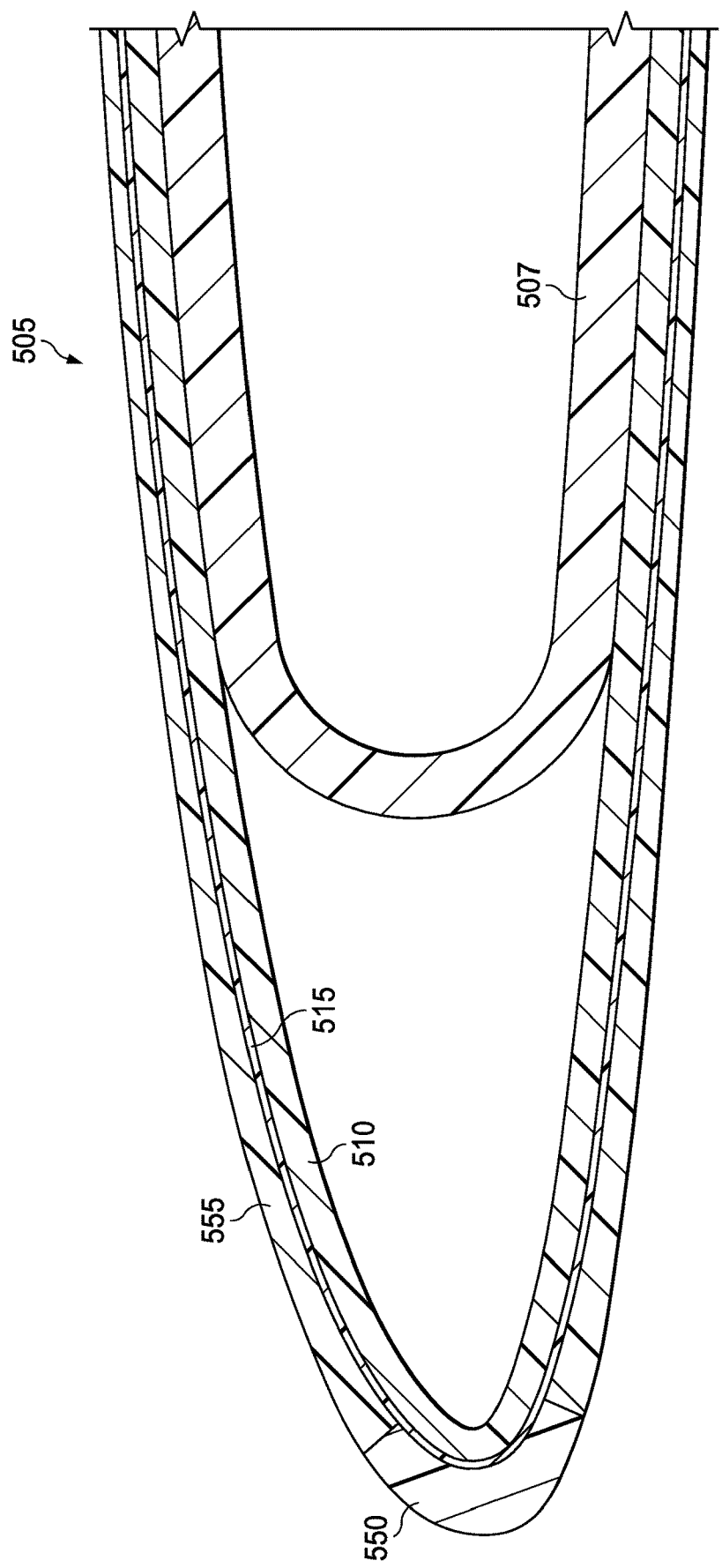
FIG. 5F shows a cross-section of another embodiment of the present invention.

FIG. 5F illustrates a cross-section of another embodiment of the present invention. Rotor blade 505 with spar 507 is shown. In this embodiment, two layers of erosion protective coating 550 and 555 are applied to different portions of the screen 515. Erosion protective coatings 550 and 555 include different materials, or different concentrations of the same materials, or some combination of different materials and different concentrations.

Figure 5G:
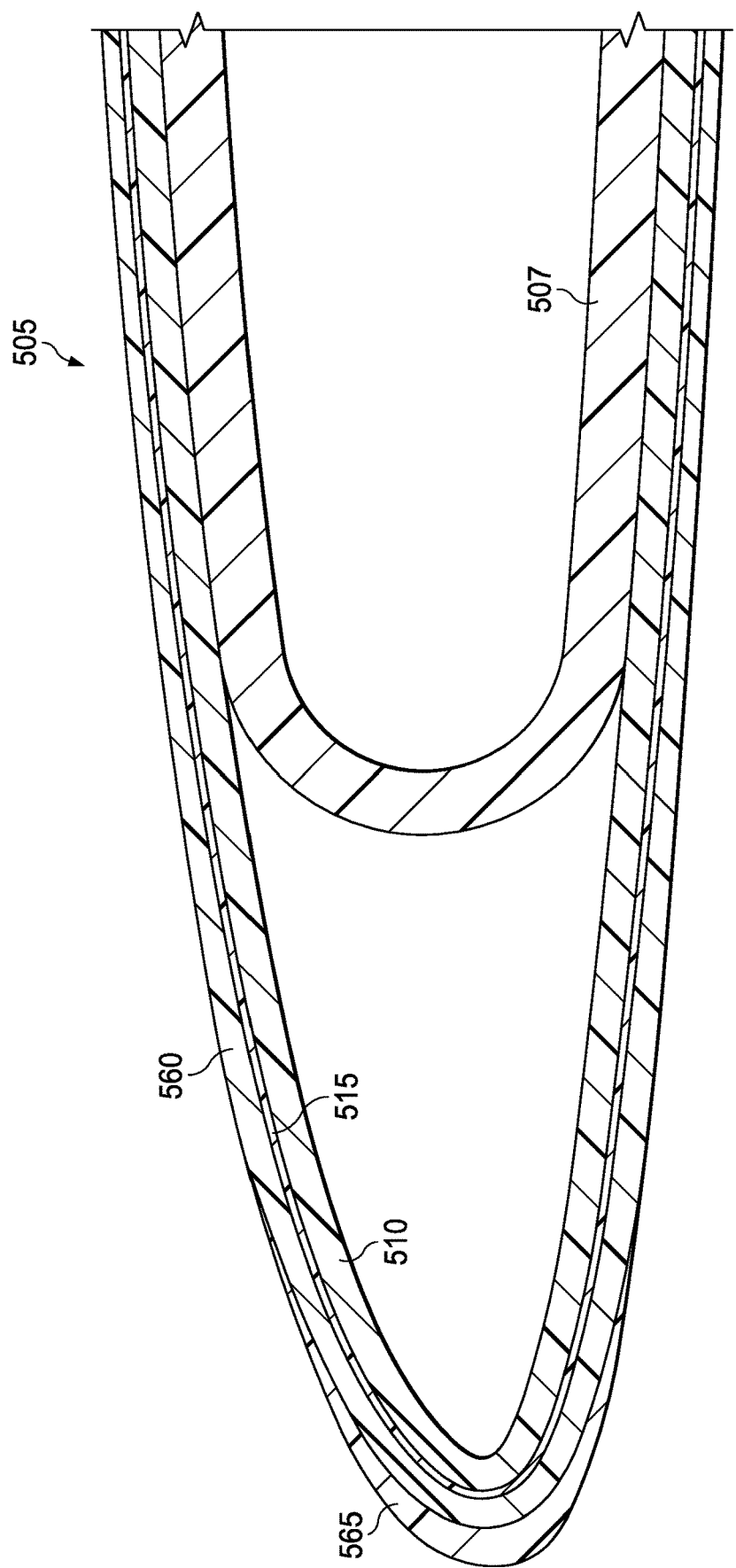
FIG. 5G shows a cross-section of another embodiment of the present invention.

FIG. 5G illustrates a cross-section of another embodiment of the present invention. Rotor blade 505 with spar 507 is shown. In this embodiment, two layers of erosion protective coating 560 and 565 are applied to the screen 515. Erosion protective coating 560 is applied directly to the screen 515, and erosion protective coating 565 is applied in varying thicknesses to erosion protective coating 560. Erosion protective coatings 560 and 565 include different materials, or different concentrations of the same materials, or some combination of different materials and different concentrations.

Figure 6A:
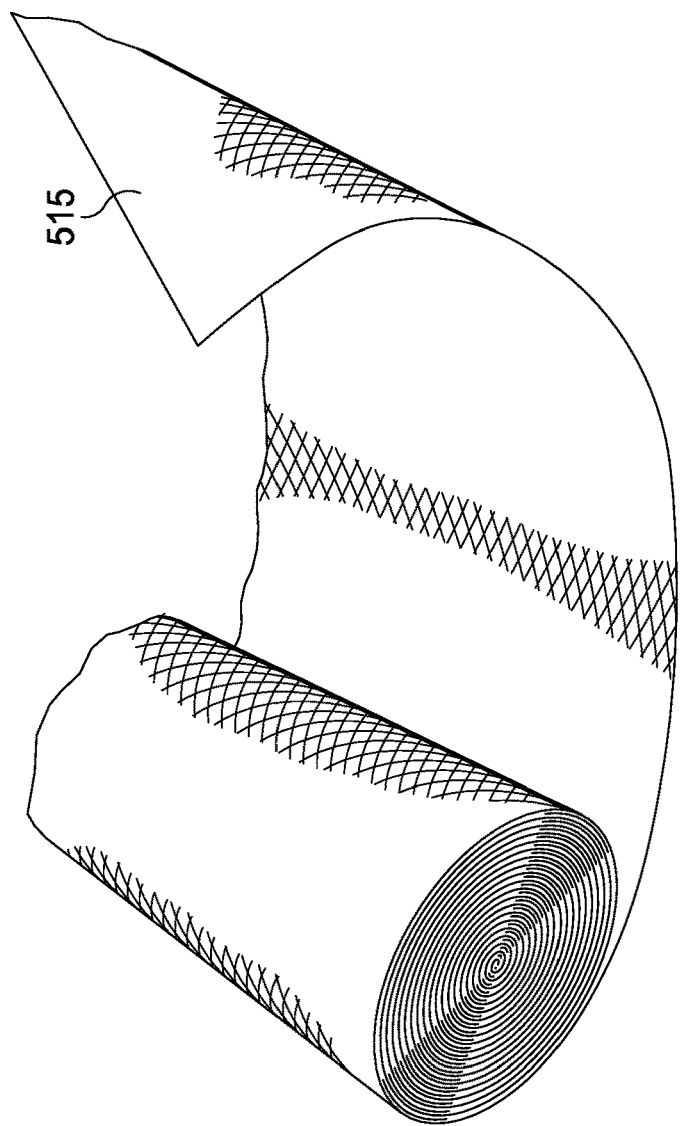
FIG. 6A depicts a roll of the screen used in embodiments of the present invention.

FIG. 6A depicts a roll of the screen 515 before it has been prepared for application to the leading edge 510 of rotor blade 505.

FIG. 6B shows the detailed structure of the screen 515. The size of the openings in the screen 515, if any, will typically vary from 1-2 microns to 0.1 cm but can be smaller or larger, depending on the coating used and whether any adhesive(s) are provided between the screen 515 and the leading edge 510 of the surface. Further, the screen 515 may include divots that do not perforate the screen 515, but rather, make the material sufficiently malleable to be worked manually to conform to the target surface. Sizes of the openings or indentations may vary down the span or the chord of the blade to vary the flexibility, strain relief, and protection from particulate intrusion with location on the blade.

FIG. 7 shows a flowchart of a method 700, an embodiment of the present invention. Method 700 is a method of protecting an aerodynamic surface from erosion. Method 700 begins with providing the aerodynamic surface comprising a leading edge in block 705. Block 710 includes applying a screen to the leading edge to carry one or more erosion protection coatings. In block 715, one or more erosion protection coatings are applied to the screen before or after the screen is applied to the leading edge, wherein the one or more erosion protection coatings protect the aerodynamic surface from erosion.

FIG. 8 shows a flowchart of another method embodiment of the present invention, method 800, a method of maintaining an aerodynamic surface with an erosion protection coating. Method 800 begins with block 805, which includes inspecting the aerodynamic surface. Method 800 continues with determining an area of erosion on the aerodynamic surface requiring maintenance, which is included in block 810. Block 815 includes obtaining data on shape of aerodynamic surface prior to its use, and block 820 includes calculating a required coating for area of erosion to restore the shape prior to use. The required coating based on the calculating of block 820 is applied in block 825.

One skilled in the art of erosion protection and repair of aerodynamic surfaces will recognize that screen 515, one or more erosion protection coatings 520, method 700, and method 800 provide an efficient and effective way to protect an aerodynamic surface from erosion or to repair such erosion, without risk of damage to the underlying blade during maintenance and repair.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A method of protecting an aerodynamic surface from erosion comprising:
   providing the aerodynamic surface comprising a leading edge;
   applying a screen to the leading edge to carry one or more erosion protection coatings; and
   applying one or more erosion protection coatings to the screen before or after the screen is applied to the leading edge, wherein the one or more erosion protection coatings protect the aerodynamic surface from erosion.

2. The method of claim 1, further comprising applying an adhesive layer before applying the screen, wherein the adhesive layer bonds the screen to the leading edge.

3. The method of claim 1, wherein the one or more erosion protection coatings comprise a plurality of layers, and each layer has a different color or indicium.

4. The method of claim 1, wherein the screen is cured with the leading edge.

5. The method of claim 1, wherein the applying the one or more erosion protection coatings to the screen comprises vapor deposition, a thermal spraying process, a thermal high-temperature fusion process, or an ionic spraying process.

6. The method of claim 1, wherein the screen is flexible such that applying it to the leading edge can be accomplished manually, pre-formed to a shape of the leading edge before application to the leading edge, or both.

7. The method of claim 1, wherein the aerodynamic surface is a rotor blade, a propeller blade, a wing, a horizontal stabilizer, a vertical stabilizer, a canard, or a turbine blade.

8. The method of claim 1, wherein the screen comprises metal-matrix composites, polymer-metal composites, ceramics-metal composites, ceramic-polymer composites, titanium, steel, nickel, aluminum, or some combination of those materials.

9. The method of claim 1, wherein the one or more erosion protective coatings comprise at least one of: tungsten carbide, titanium nitride, or chromium.

10. The method of claim 1, wherein the one or more erosion protective coatings comprise two or more layers, and each layer comprises a different erosion protection coating material, a different concentration of different erosion protection coating material, or a combination of different erosion protection coating materials and different concentrations of the different erosion protection coating material.

* * * * *